United States Patent
Fischer et al.

(10) Patent No.: US 7,856,507 B2
(45) Date of Patent: Dec. 21, 2010

(54) DATA TRANSMISSION PROCESS

(75) Inventors: Uwe Fischer, Karlsruhe (DE); Olivier Ficatier, Nice (FR); Guillaume Duchene, Antibes (FR); Jochen Hoenig, Oehringen (DE)

(73) Assignee: SAP AG, Walldorf (DE)

( * ) Notice: Subject to any disclaimer, the term of this patent is extended or adjusted under 35 U.S.C. 154(b) by 700 days.

(21) Appl. No.: 11/208,997

(22) Filed: Aug. 22, 2005

(65) Prior Publication Data

US 2006/0078006 A1    Apr. 13, 2006

(30) Foreign Application Priority Data

Sep. 20, 2004   (EP)   .................................. 04292253

(51) Int. Cl.
| | |
|---|---|
| G06F 15/16 | (2006.01) |
| G06F 15/173 | (2006.01) |
| G06F 11/00 | (2006.01) |
| G06F 3/00 | (2006.01) |
| G06F 5/00 | (2006.01) |
| G06F 13/36 | (2006.01) |

(52) U.S. Cl. ........................ 709/232; 709/217; 709/223; 709/231; 709/234; 709/237; 370/229; 370/225; 370/244; 710/61; 710/113

(58) Field of Classification Search ........................ None
See application file for complete search history.

(56) References Cited

U.S. PATENT DOCUMENTS

| | | | |
|---|---|---|---|
| 5,752,251 A | 5/1998 | Cripps | |
| 5,754,754 A | 5/1998 | Dudley et al. | |
| 5,838,912 A * | 11/1998 | Poon et al. ................... | 709/204 |
| 5,912,902 A | 6/1999 | Monroe | |
| 6,032,180 A * | 2/2000 | Nishikawa ................... | 725/115 |
| 6,092,087 A | 7/2000 | Mastors | |
| 6,134,237 A * | 10/2000 | Brailean et al. ............. | 370/394 |
| 6,363,497 B1 * | 3/2002 | Chrabaszcz .................. | 714/13 |
| 6,526,447 B1 | 2/2003 | Giammaria | |
| 6,963,923 B1 * | 11/2005 | Bennett ....................... | 709/232 |
| 7,158,990 B1 * | 1/2007 | Guo et al. .................... | 707/102 |
| 2002/0049853 A1 * | 4/2002 | Chu et al. .................... | 709/237 |
| 2002/0142780 A1 * | 10/2002 | Airy et al. .................... | 455/452 |
| 2002/0152315 A1 * | 10/2002 | Kagan et al. ................. | 709/228 |
| 2002/0154600 A1 * | 10/2002 | Ido et al. ..................... | 370/216 |
| 2003/0120675 A1 * | 6/2003 | Stauber et al. .............. | 707/100 |
| 2003/0208720 A1 * | 11/2003 | Anderson et al. ........... | 715/513 |
| 2004/0105386 A1 * | 6/2004 | Sipola ...................... | 370/230.1 |
| 2004/0158586 A1 * | 8/2004 | Tsai ............................ | 707/200 |
| 2004/0260863 A1 * | 12/2004 | Gemmell ..................... | 711/100 |
| 2004/0260889 A1 * | 12/2004 | Cypher ....................... | 711/148 |
| 2005/0132082 A1 * | 6/2005 | Lee et al. ..................... | 709/231 |
| 2005/0209927 A1 * | 9/2005 | Aaltonen et al. .............. | 705/26 |
| 2005/0243857 A1 * | 11/2005 | Hofstaedter et al. ......... | 370/447 |
| 2006/0129631 A1 * | 6/2006 | Na et al. ...................... | 709/203 |

* cited by examiner

*Primary Examiner*—Ario Etienne
*Assistant Examiner*—Ho Shiu
(74) *Attorney, Agent, or Firm*—Schwegman, Lundberg & Woessner, P.A.

(57) ABSTRACT

A first device transmits messages to a second device. The first device keeps track of messages that have already been transmitted from the first device to the second device, experiences an interruption in transmission of messages at the first device, and resumes the transmission from the first device following the interruption. Resuming the transmission includes transmitting only messages that have not already been completely transmitted from the first device to the second device.

18 Claims, 2 Drawing Sheets

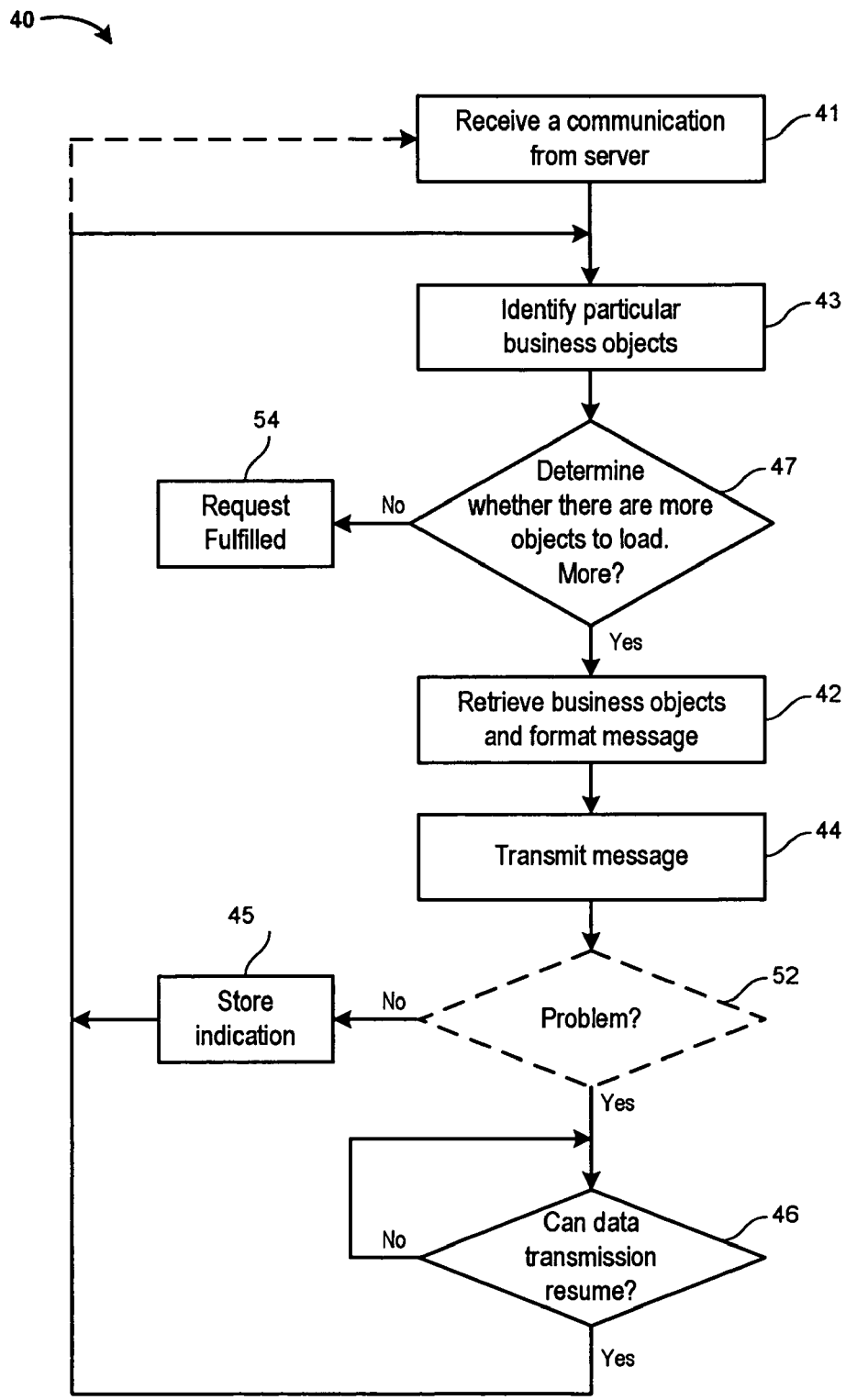

7,856,507 B2

DATA TRANSMISSION PROCESS

TECHNICAL FIELD

This disclosure relates generally to processing by a digital computer. More particularly, the application relates to a process for transmitting data, such as business objects, from a client to a server.

RELATED APPLICATION

Pursuant to 35 U.S.C. §119, benefit is claimed of European Patent Application 04 292 253.4, which was filed on Sep. 20, 2004, through INPI.

BACKGROUND

Networked computing systems that employ centralized data management may store data in a server referred to as a "repository" or in more than one repository servers. For example, an organization may store objects relating to business aspects, such as sales, manufacturing, distribution, and the like. A local machine, e.g., a user's workstation, can link to the repository and thereby gain access to an entire library of such business objects. This model promotes data consistency throughout the organization, thereby increasing overall efficiency.

Repositories of large organizations may contain large numbers of business objects. For example, it is not uncommon for an organization to use hundreds of thousands, or even millions, of business objects. Loading such large numbers of business objects into a repository can be a time-consuming task. This task is complicated by errors that occur during loading (e.g., due to instabilities in software or hardware, false handling, etc.) which, heretofore, required the loading process to begin again from scratch.

SUMMARY

In a first general aspect, a method, performed by a first device, to transmit data to a second device, comprises beginning transmission of the data to the second device, storing indications of data that has been transmitted, and, when there is an interruption in transmission of the data from the first device, resuming transmission of the data to the second device after the interruption.

In some embodiments, resuming transmission may comprise identifying the data that has been transmitted based on the indications, and transmitting, to the second device, data that has not already been transmitted to the second device. The data may be transmitted as messages, and resuming transmission may comprise transmitting, to the second device, only messages that have not been completely transmitted. When the interruption occurs partway through transmission of a message, an indication corresponding to the message may not be stored, and resuming transmission may comprise transmitting the data starting at a beginning of the message. Resuming transmission from the first device may occur automatically and not in response to a communication from the second device. In some embodiments, the method, performed by a first device, to transmit data to a second device, may further comprise receiving a communication from the second device, wherein transmission of the data from the first device is resumed in response to the communication from the second device.

The communication may comprises one of a) a request for all the data, and b) a request for at least some of the data that has not already been transmitted. The communication may be received by the first device following the interruption. The indications may comprise entries of a database that identify the data that has been transmitted. The entries may comprise pointers to the data that has been transmitted. The data may comprise business objects that are grouped into messages, the data being transmitted as the messages. The second device may comprise a central repository in a networked computing system. The data may comprise business objects that are made available to other devices in the networked computing system via the central repository.

In a second general aspect, a method of transmitting messages from a first device to a second device comprises keeping track of messages that have already been transmitted from the first device to the second device, and, if there is an interruption in transmission of messages at the first device, resuming the transmission from the first device following the interruption. Resuming the transmission may comprise transmitting only messages that have not already been completely transmitted from the first device to the second device.

In some embodiments, data may be transmitted from the first device to the second device as messages comprised of multiple objects. If an interruption is experienced partway through a message, the transmission may be resumed starting at the beginning of the message.

In a third general aspect, a system may comprise a repository for storing data objects and a client, in communication with the repository, to load the data objects onto the repository. The data objects may be transmitted from the client to the repository as messages, wherein a message comprises plural data objects. When loading the data objects, the client may keep track of messages that have already been transmitted to the repository, and may resume the transmission of the messages to the repository following an interruption in the transmission. When resuming the transmission, the client may transmit only messages that have not already been completely transmitted to the repository. The client may resume the transmission either in response to a communication from the repository or automatically without requiring the communication from the repository.

In a fourth general aspect, a method of transmitting business objects from a client to a server comprises beginning transmission of the business objects to the server, storing indications of messages that have been transmitted from the client and, when there is an interruption in the transmission from the client, identifying messages that have already been transmitted from the client based on the indications and transmitting only messages that have not already been transmitted to the client. The business objects may be transmitted as messages, where a message comprises plural business objects.

Advantages of the methods, techniques and systems described herein may include any or all of the following. The amount of data that is re-transmitted in the event of a transmission interruption may be reduced. The need for consistency checks on a server may be reduced without substantially adversely affecting the amount of storage apace on the server. The amount of time needed to load business objects may be reduced.

These general and specific aspects and embodiments may be implemented using a system, an apparatus, a method, or a computer program, or any combination of systems, apparatus, methods, and computer programs.

The details of one or more embodiments of the invention are set forth in the accompanying drawings and description below. Other features, objects, and advantages of the invention will be apparent from the description and drawings, and from the claims.

DESCRIPTION OF THE DRAWINGS

FIG. 2 is a flowchart showing an example of a data transmission process for transmitting business objects to a central repository.

Like reference numerals in different figures indicate like elements.

DETAILED DESCRIPTION

Figure 1:
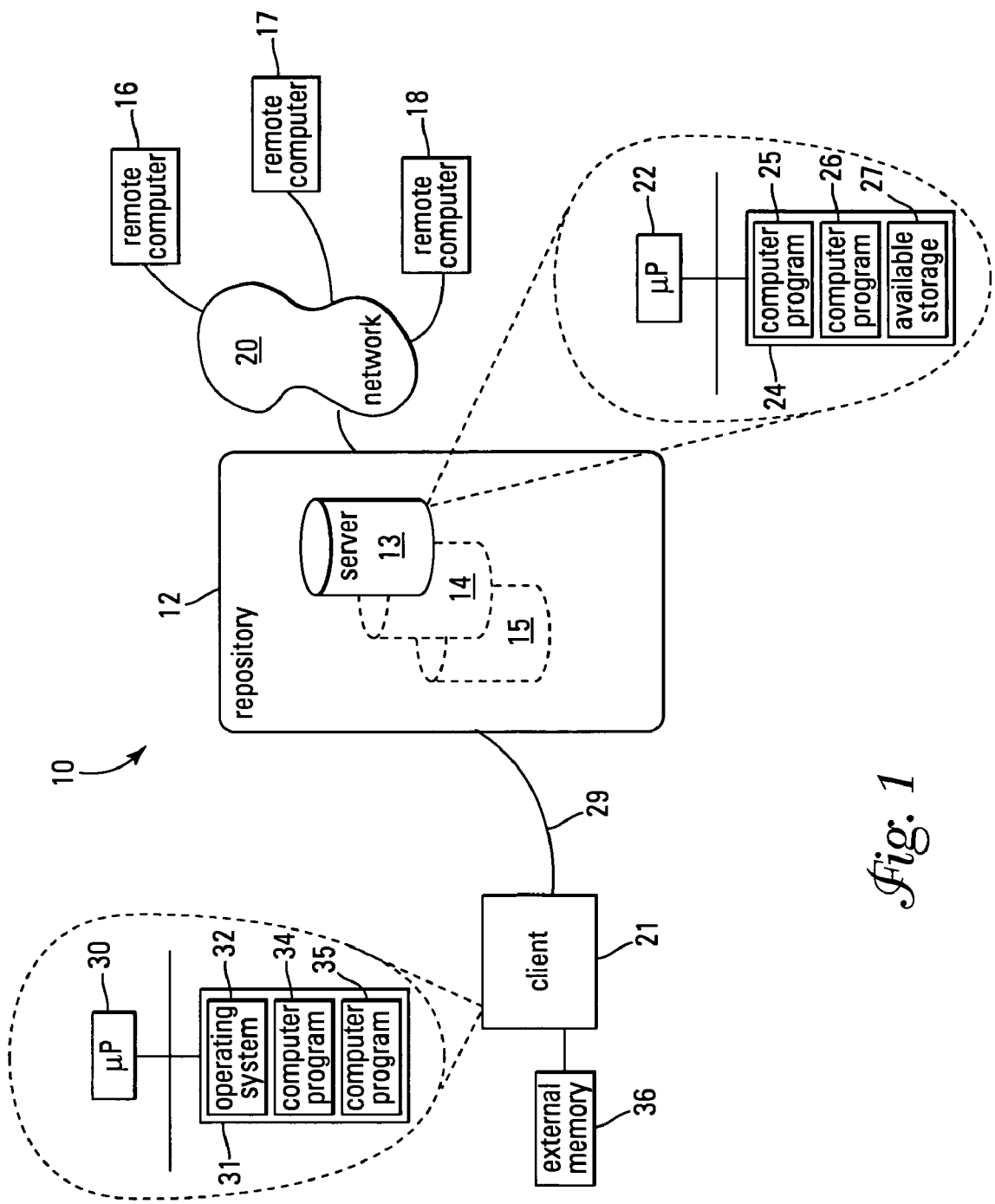
FIG. 1 is a block diagram of hardware on which the data transmission process described herein may be implemented.

FIG. 1 shows an example of a computer system 10 on which the data transmission process described herein may be implemented. Computer system 10 includes a repository 12. Repository 12 may comprise one or more devices, such as one or more servers 13 to 15, which store a library of business objects. These business objects are accessible to one or more remote computers 16 to 18 via a network 20, which provides a communication link between repository 12 and remote computers 16 to 18.

As noted above, repository 12 may include one server 13 or multiple servers 13 to 15 (servers 14 and 15 are depicted using dashed lines to indicate that they are optional). In the case of multiple servers, server 13 may act as a controller or "load balancer" for the remaining servers 14 and 15. In this role, server 13 may route data, requests, and instructions between an "external device" (e.g., a remote computer 16 or client 21—described below) and a "slave" server, such as server 14. For example, server 13 may store objects locally until it is full, then route data to a server with available storage, such as server 14. For the purposes of the following description, such internal communications between server 13 and any of its slave servers will be assumed, and will not be addressed. Only communications between server 13 and external devices will be described.

Server 13 may be any type of computing device that is capable of receiving and storing data, and of communicating with client 21. As shown in FIG. 1, server 13 includes one or more processors 22 and memory 24 that stores computer programs that are executed by processor(s) 22. In this regard, memory 24 stores a computer program 25 for communicating with remote computers 16 to 18, e.g., to retrieve an object in response to a request from a remote computer, and to send the retrieved object to the remote computer. Memory 24 also stores a computer program 26 for use in loading objects from client 21 into repository 12, and may also contain available storage 27 to store business objects. Alternatively, available storage 27 can be external to server 13.

Remote computers 16 to 18 may be any type of devices, including, but not limited to, desktop or laptop computers, personal digital assistants ("PDAs"), and mobile telephones. Communication is effected over network 20, which may include a local area network ("LAN"), a wide area network ("WAN"), the Internet, a wireless link (e.g., a wireless fidelity, or "Wi-Fi", link), or some combination of the preceding.

Client 21 may be any type of computing device, such as a desktop computer, mainframe, or the like, that is capable of obtaining business objects and of transmitting those business objects to repository 12. A high-speed data link 29, such as Ethernet, connects client 21 to server 13 in repository 12. The connection may be local or remote.

As shown in FIG. 1, client 21 includes one or more processor(s) 30 and memory 31 that stores computer programs that are executed by processor(s) 30. In this regard, memory 31 stores an operating system 32, a computer program 34 that enables communication between client 21 and server 13, and a computer program 35 for retrieving and loading business objects into repository 12. The business objects may be stored on client 21; the business objects may be stored in another device, such as an external memory 36; or the business objects may be stored on both client 21 and external device 36.

FIG. 2 shows a process 40 that is implemented by computer program 35 to retrieve, and to transmit, business objects from client 21 to server 13, and thereby load those business objects into repository 12. In this embodiment, process 40 is implemented while data consistency and other similar checks are disabled on server 13. More specifically, during conventional data transmission processes, server 13 performs consistency checks on newly-received data to ensure, e.g., that the newly-received data is not already present on server 13. These check are performed, in part, because conventional data transmission processes, when re-started, often re-transmit large numbers of data objects that were transmitted during a previously-attempted transmission.

Referring to FIG. 2, process 40 receives (41) a communication from server 13. The communication may constitute a "request" to load business objects into repository 12. The communication may identify (43), or cause client 21 to identify, particular business objects. Alternatively, the communication may identify (43), or cause client 21 to identify, specific regions of memory in which those business objects are located. In one embodiment, the client 21 may store the particular objects that were identified (43).

Process 40 then determines (47) whether one or more objects remain to be loaded. Initially, no business objects will have been loaded, so process 40 retrieves (42) business objects from either local or remote storage and formats (42) the business objects for transmission. "Formatting", in this embodiment, may be as simple as organizing the business objects into "messages". Each message may include, e.g., one thousand business objects. A message may or may not include a header providing, e.g., the number and identities of business objects contained in the message. For example, the message could be formatted using eXtensible Markup Language ("XML"). It is noted that the use of "messages" is but one way of implementing data transfer; any other transfer format may be used.

Process 40 transmits (44) a message from client 21 to server 13. In some cases, the system may experience an interruption in the transmission (44) of data (e.g., a message comprising business objects) from client 21 to server 13 or in the preceding actions (43, 47 or 42). The interruption typically is indicative of some problem on client 21. For example, the interruption may be caused by a power outage at client 21 or a "crash" of hardware or software at client 21. The interruption may also be caused by other factors, such as a break or error associated with high-speed data link 29. Whatever the cause may be, the result is the same: the data transmission process from client 21 to server 13 stops. If there is a problem, client 21 will typically be unaware of the problem (e.g., due to a "crash" of client 21 or a fault in line 29). Thus, the "Problem?" decision block 52 is drawn in dashed lines, to indicate that there is a break in the flow from the perspective of client 21, and that the decision block is not implemented via one or more instructions in computer program 35.

If there is no problem in the transmission of the message, (i.e., the entire message has been sent from client 21 to server 13), process 40 stores (45) an indication that the message has been successfully processed, i.e. transmitted. In one embodiment, the indication may be stored in a dedicated area of memory 31, and may take any form. For example, the indication may be one or more entries in a database, e.g., one or more list(s) or table(s) identifying data that has been transmitted, or the indication may be pointer(s) to data in memory that has been transmitted. In another embodiment, process 40 may cause the server 13 to store (45) the indication in a dedicated area of memory 24. It is noted that, in some embodiments, process 40 keeps a record of the business objects included in each message and, thus, only reference to the transmitted message is needed to identify transmitted business objects (i.e., data). In other embodiments, process 40 may not keep a record of the identities of business objects in a message, in which case, references to individual business objects may be stored. In the foregoing manner, process 40 keeps track of a data transmission between client 21 and server 13.

After storing (45) the indication that a message has been transmitted, process 40 continues loading remaining business objects. Continuing to load remaining business objects may comprise first identifying (43) business objects that must be loaded. In one embodiment, the process 40 may compare the indications stored in action 45 with the original communication from the server 13 that was received in action 41. In another embodiment, if the identified (43) objects were initially stored by the client 13, the process 40 may compare the indications stored in action 45 with the stored identified objects to determine (47) whether there are other objects to load. In another embodiment, the server 13 may track which objects have been received. If the process 40 determines (47) that there are no more objects to transmit, the original request has been fulfilled, and the process 40 terminates in action 54. If there are more objects to transmit, the process 40 continues retrieving business objects (42), formatting messages (42) and transmitting the messages (44).

Returning to the scenario where there is a problem or interruption in the transmission of data, the interruption of data transmission is detected at server 13 (e.g., by computer program 26), according to one embodiment. In this regard, during data transfer, computer program 26 may expect to receive messages at a specified rate. If a predetermined amount of time passes without receiving a message, computer program 26 may send a communication to client 21 (over high-speed data link 29). This communication may simply be a repeat of the communication received (41) previously (i.e., a request to transmit or re-transmit the data), or the communication may be a request for only those business objects that have not already been received by server 13. The latter requires that server 13 keep a record of the business objects that it requested and of the business objects that it received, as is often done.

In one embodiment, process 40 resumes the data transmission from client 21 in response to an above-described communication from server 13. For example, in this embodiment, process 40 may jump from action 46 to action 41 via the dashed line. In another embodiment, process 40 resumes the data transmission from client 21 automatically and not in response to any communication or data request from server 13. For example, in this embodiment, the process 40 may remain in decision block 46 while the client reboots (in the case of a crash, for instance), then process 40 may jump from action 46 to action 43 via the solid line.

In any case, when data transmission resumes (46), process 40 examines the indication(s) stored (45) above for messages to determine which data (e.g., messages, objects, etc.) has already been transmitted prior to the point of the interruption. Determining which data has been transmitted may include re-identifying (43) particular objects to load, or comparing the indication(s) to an original identification of objects that may have been previously stored. If the original identification of the objects was previously stored, process 40 may determine (47) whether more objects must be loaded, without repeating action 43. In one embodiment, the server 13 may track received messages and may, in the case of a problem or interruption, send or re-send (41) a communication. In this embodiment, the process 40 may retrieve (42) business objects and format (42) messages without repeating either action 43 or action 47.

Process 40 may resume transmission of messages at a point that substantially corresponds to the point at which the interruption in data transmission occurs, and transmit only data that has not been completely transferred to server 13. More specifically, in one embodiment, if the interruption occurred partway through a message, process 40 would not store (45) an indication for that message. As a result, process 40 would consider that message not to have been completely transmitted, and thus would re-transmit that message in its entirety. Thereafter, process 40 resumes transmission in the manner shown in FIG. 2. Of course, if the interruption occurred between messages, process 40 may resume transmission from the exact point (relative to the data) at which the interruption occurred.

In other embodiments, the entire message need not be re-transmitted if an interruption occurred partway through the message. For example, an indication could be stored for partial transmission of a message (or other type of data transmission unit, e.g., an object) and, following resumption of the data transmission process, it would only be necessary to transmit the portion of the message the was not already transmitted. The "granularity" (e.g., message portions that are re-transmitted) associated with the data transmission may be set as desired for a particular system.

If business objects (or other data) are being transmitted in a particular order, process 40 may resume transmission in that order. If no particular order is required, process 40 may resume transmission in an order that is most convenient.

Advantageously, process 40 may reduce the amount of data that is re-transmitted to server 13 in the event of a transmission interruption, thereby reducing the need for consistency checks on server 13 without substantially adversely affecting the amount of storage space on server 13. By reducing the amount of data that needs to be transmitted to server 13 in the event of a transmission interruption, process 40 also may reduce the amount of time needed to load business objects from client 21 to repository 12. In this regard, both client 21 and server 13 may be aware of process 40, and can exchange communications regarding process 40 and the data objects being exchanged.

Process 40 and its various modifications described above (referred to collectively as "the data transmission process") are not limited to use with the hardware and software described above; they may find applicability in any computing or processing environment and with any type of machine that is capable of running machine-readable instructions. Moreover, process 40 is not limited to processing business objects but may be applied to process other kinds of data.

The data transmission process can be implemented in digital electronic circuitry, or in computer hardware, firmware, software, or in combinations thereof. The data transmission process can be implemented via a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the data transmission process can be performed by one or more programmable processors executing a computer program to perform the functions of the data transmission process. The method steps can also be performed by, and data transmission process can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The data transmission process can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the data transmission process, or any combination of such back-end, middleware, or front-end components. The components of the system can be interconnected by any form or medium of digital data communication, e.g., a communication network. Examples of communication networks include a LAN and a WAN, e.g., the Internet.

Process 40 is not limited to use with client 21 and repository 12. Process 40 may be used to transfer data between any two devices over any communication media.

Method steps associated with the data transmission process can be rearranged and/or one or more such steps can be omitted to achieve the same results described herein. The data transmission process may be fully automated, meaning that they operates without user intervention, or interactive, meaning that all or part of the data transmission process may include some user intervention.

Elements of different embodiments described herein may be combined to form other embodiments not specifically set forth above. Other embodiments not specifically described herein are also within the scope of the following claims.

What is claimed is:

1. A method, performed by a first device, to transmit business objects to a second device, the method comprising:
   formatting the business objects into a message in preparation for transmission to the second device;
   keeping a record of the business objects included in the message, the record including identifications that identify the business objects;
   beginning transmission of the message to the second device;
   storing indications of at least a plurality of the business objects included within the message that has been completely transmitted;
   experiencing an interruption in transmission of the message from the first device;
   comparing the indications to the identifications that identify the business objects in order to identify at least a plurality of the business objects that has not been transmitted; and
   transmitting, to the second device, the message including the at least the plurality of the business objects that has not been transmitted.

2. The method of claim 1, wherein the indications comprise pointers to the at least the plurality of the business objects that has been completely transmitted.

3. The method of claim 1, wherein the indications comprise entries of a database that identify the at least the plurality of the business objects that has been completely transmitted.

4. The method of claim 1, wherein the transmitting, to the second device, after the interruption from the first device occurs automatically and not in response to a communication from the second device.

5. The method of claim 1, further comprising:
   receiving a communication from the second device;
   wherein transmission of the business objects from the first device is resumed in response to the communication from the second device.

6. The method of claim 1, wherein the second device comprises a central repository in a networked computing system, and the business objects are made available to other devices in the networked computing system via the central repository.

7. The method of claim 1, wherein the message is in Extensible Markup Language (XML) format.

8. A computer program product tangibly embodied in a non-transitory machine-readable storage device, the computer program product comprising instructions that cause a first device to:
   format the business objects into a message in preparation for transmission to a second device;
   keep a record of the business objects included in the message, the record including identifications that identify the business objects;
   begin transmission of the message to the second device;
   store indications of at least a plurality of the business objects included within the message that has been completely transmitted; and
   after an interruption in the transmission of the message from the first device, compare the indications to the identifications that identify the business objects in order to identify the at least plurality of the business objects that has been completely transmitted, and transmit, to the second device, the message including at least a plurality of the business objects that has not been transmitted.

9. The computer program product of claim 8, wherein the indications comprise pointers to the at least the plurality of the business objects that has been completely transmitted.

10. The computer program product of claim 8, where the indications comprise entries of a database that identify the at least the plurality of the business objects that has been completely transmitted.

11. The computer program product of claim 8, further comprising instructions that cause the first device to:
   receive a communication from the second device;
   wherein transmission of the business objects to the second device is begun in response to the communication.

12. The computer program product of claim 8, wherein the transmission after the interruption comprises transmitting from the first device occurs automatically and not in response to a communication from the second device.

13. The computer program product of claim 8, further comprising instructions that cause the first device to:
   receive a communication from the second device;
   wherein transmission of the business objects from the first device is resumed in response to the communication from the second device.

14. The computer program product of claim 13, wherein the communication comprises a request for at least the plurality of the business objects that has not been transmitted.

15. The computer program product of claim 13, wherein the communication is received by the first device following the interruption.

16. The computer program product of claim 8, wherein the second device comprises a central repository in a networked computing system, and the business objects are made available to other devices in the networked computing system via the central repository.

17. A first apparatus to transmit business objects to a second apparatus, the first apparatus comprising:
   a processor that executes instructions to:
      format the business objects into a message in preparation for transmission to the second apparatus;
      keep a record of the business objects included in the message, the record including identifications that identify the business objects;
      begin transmission of the message to the second apparatus;
      store indications of at least a plurality of the business objects included within the message that has been completely transmitted;
      after an interruption in the transmission of the message from the first apparatus, compare the indications to the identifications that identify the business objects in order to identify at least a plurality of the business objects that has not been transmitted; and
      transmit, to the second apparatus, the message including the at least the plurality of the business objects that has not been transmitted.

18. A system comprising:
   a repository for storing data objects; and
   a client, in communication with the repository, to load the data objects onto the repository, the data objects being transmitted from the client to the repository as a message;
   wherein, when loading the data objects, the client keeps a record of the data objects included in the message, the record including identifications that identify the business objects, stores indications of at least a previously presented plurality of the business objects included within the message that has already been transmitted to the repository, and resumes the transmission following an interruption in the transmission of the message from the client;
   wherein, when resuming the transmission, the client compares the indications to the identifications that identify the business objects in order to identify at least a previously presented plurality of the business objects that has not been transmitted and transmits the at least the previously presented plurality of the business objects that has not been transmitted to the repository; and
   wherein the client resumes the transmission either in response to a communication from the repository or automatically without requiring the communication from the repository.

* * * * *